United States Patent [19]
Galloway

[11] Patent Number: 4,843,244
[45] Date of Patent: Jun. 27, 1989

[54] SECURITY SENSORS

[75] Inventor: John L. Galloway, Edinburgh, Scotland

[73] Assignee: Racal-Guardall (Scotland) Limited, Edinburgh, Scotland

[21] Appl. No.: 141,571

[22] Filed: Jan. 5, 1988

[30] Foreign Application Priority Data

Jan. 15, 1987 [GB] United Kingdom ................. 8700866

[51] Int. Cl.[4] ................................................ G01J 1/00
[52] U.S. Cl. .................................. 250/342; 250/336.1
[58] Field of Search ............................. 250/342, 336.1; 340/522, 565

[56] References Cited

U.S. PATENT DOCUMENTS 4,275,303 6/1981 Mudge ................................ 250/342
4,746,906 5/1988 Lederer ............................ 250/336.1

*Primary Examiner*—Janice A. Howell
*Assistant Examiner*—Tuan Nguyen
*Attorney, Agent, or Firm*—Leydig, Voit & Mayer

[57] ABSTRACT

An intruder sensor contains a microwave detector and a passive infra-red detector in the same housing. A panel in the housing defines a series of Fresnel lens segments which define the zones for the infra-red sensitive element. The panel also forms the radome for the microwave detector. In the twin horn microwave detector, the infra-red sensitive element is mounted on a circuit board between the horns.

5 Claims, 1 Drawing Sheet

SECURITY SENSORS

BACKGROUND OF THE INVENTION

1. Technical Field

The present invention relates to security sensors of the type known as dual-technology sensors. Such sensors include both a passive infra-red intruder detector and a microwave intruder detector.

2. Prior Art

A sensor of this type is described in EP-A-No. 0 147 925 in the name of C & K Systems, Inc. The purpose of such sensors is to reduce the possibility of false alarms. The outputs from each detector are processed independently. However, an alarm signal is only generated if both detectors have been activated. Therefore this type of sensor can be defeated if one of the detectors is masked. In existing dual-technology sensors, the two independent detectors are mounted one above the other or side-by-side so that the overall dimensions of the sensor are considerably greater than those of either a passive infra-red sensor or a microwave sensor.

SUMMARY OF THE INVENTION

It is an object of the invention to provide an intruder sensor which has the advantages of a dual-technology sensor without requiring the conventional large housing.

The present invention accordingly provides a sensor including a housing, a passive infra-red detector and a microwave detector mounted in said housing, and a panel in said housing, which panel is shaped to define at least one Fresnel lens segment through which infra-red radiation can pass, said panel also allowing microwave radiation to pass therethrough, said passive infra-red detector including at least one infra-red sensitive element having an electrical output and being positioned in said housing behind said panel in order to receive infra-red radiation through said panel, and a processing circuit connected to said output of said element, said microwave detector including means for transmitting microwaves through said panel and means for receiving microwaves reflected back from a target through said panel, and a processing circuit connected to said receiving means.

By using a single panel which performs the function of an optical arrangement and infra-red transmitting window for the infra-red detector and also the function of a radome for the microwave detector, a considerable space saving may be achieved. Where the transmitter and receiver of the microwave detector comprise separate flared horns for the transmitter and receiver cavities, the infra-red sensitive element is conveniently located intermediate the openings of the two horns resulting in an extremely compact design.

A further advantage of this sensor is that it is relatively difficult to mask. The microwave detector is capable of detecting certain types of masking, e.g. placing of a metal plate over the window, which may be applied by unauthorised persons to the window. It is also possible to use independent anti-masking devices, that have been proposed for other types of security sensor, with the sensor of the invention. In this case only one such device is needed to secure both detectors against masking, whereas in prior art dual technology sensors, each detector requires its own anti-masking device. Various anti-masking devices are known for use with microwave detectors, although such devices are less common for use with passive infra-red detectors. In the present sensor a conventional microwave anti-masking device will serve to protect the infra-red detector against masking.

Preferably the panel is made of high density polyethylene which is translucent to infra-red radiation, provides a good conductivity match for transmitting microwaves and can readily be moulded into the required shape to define the Fresnel lens segments.

A dual- technology sensor in accordance with the present invention will now be described.

DESCRIPTION OF PREFERRED EMBODIMENTS

Figure 1:
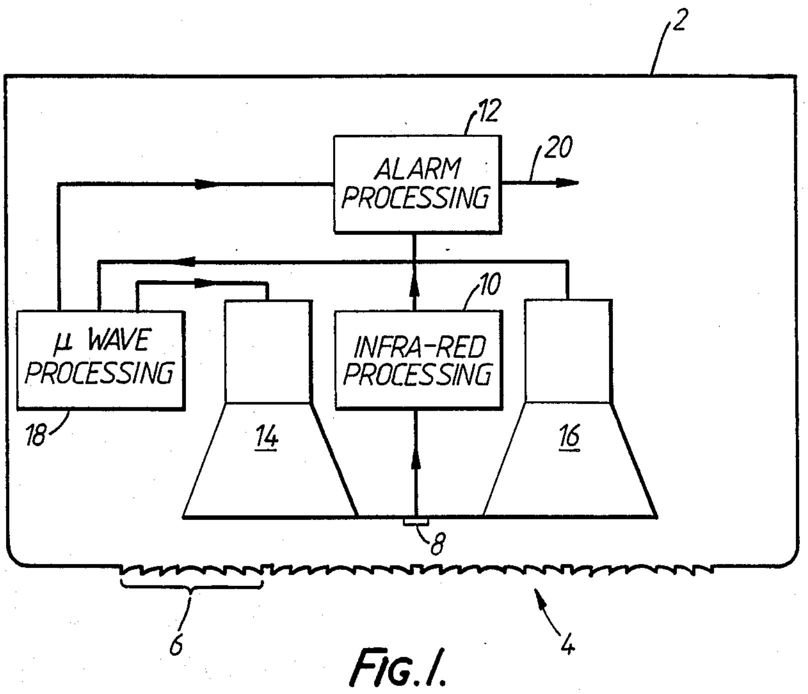
FIG. 1 is a diagrammatic plan view of a sensor in accordance with one embodiment of the present invention.

The dual-technology sensor illustrated in FIG. 1 comprises a housing 2 with a front panel 4 moulded out of high density polyethylene to define a series of Fresnel lens segments 6. Four Fresnel lens segments are shown positioned side-by-side in the panel 4. However, it will be appreciated that any arrangement of Fresnel lens segments to define the required zone coverage can be employed.

A passive infra-red sensitive element 8 is positioned at an appropriate spacing from the front panel 4 so that infra-red radiation from the exterior may be focused by the Fresnel lens segments onto the element 8.

The infra-red sensitive element 8 may be one or more ceramic pyroelectric devices as used in conventional passive infra-red sensors. The output of the element 8 is connected to an infra-red processing circuit 10. The circuit 10 responds to low frequency changes in the infra-red radiation received by the element 8 in order to produce an alarm signal when the fluctuation exceeds a predetermined magnitude. This fluctuation in the received infra-red radiation is due to passage of an intruder across the zones defined by the Fresnel lens segments in a known manner. The output from the infra-red processing circuit 10 is fed to an alarm processing circuit 12.

The housing 2 also contains a microwave intruder detector of a conventional type. A twin horn detector is shown which allows the infra-red sensitive element 8 to be mounted on a printed circuit board mounted between the two horns 14 and 16. As shown the circuit board is in the same plane as the openings of the horns to ensure that its field of view is not restricted by the horns. Each horn 14, 16 is coupled to a respective cavity for receiving or transmitting.

A microwave processing and control circuit 18 causes a pulse of microwave energy to be emitted from the horn 14 through the radome which is defined by the panel 4. Any microwave radiation reflected from an intruder passes back through the panel 4 to receiving horn 16. The received radiation is mixed in the receiving cavity with a small amount of local oscillator power coupled directly from the transmitting cavity to produce a doppler signal. The emission of microwaves is controlled by the circuit 18 and the reflected radiation is also analysed in this circuit in a known manner to produce an alarm signal which is fed to the alarm processing circuit 12.

The alarm processing circuit 12 only produces an alarm output on line 20 if alarm signals are produced from both the infra-red processing circuit 10 and the microwave processing circuit 18. The alarm processing circuit may also control the microwave processing and control circuit 18 to cause the microwave detector to emit a microwave pulse only in response to receipt of an alarm signal from the infra-red processing circuit 10.

The Fresnel lens segments can readily be moulded into material such as high density polyethylene, which has been used as the material of the radome in conventional microwave intruder detectors because it provides a good conductivity match for the microwave frequencies typically used and therefore little radiation is reflected back from the surface of the panel directly to the receiving cavity.

Figure 2:
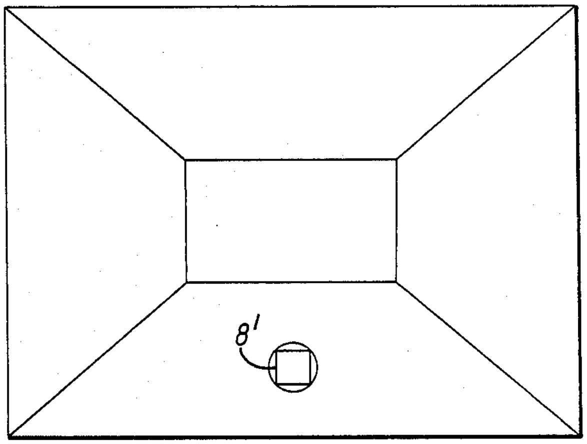
FIG. 2 is a front view of a common transmitting and receiving horn showing an infra-red sensitive element mounted inset into the wall for use in a second embodiment of the sensor.

The compact construction using a common radome and Fresnel lens window may also be employed with a microwave detector which uses a common flared horn with either separate or common transmitter and receiver cavities. In this case, the infra-red sensitive element may be placed on a circuit board to one side, or just above or below the horn, or be inset into the wall of the horn itself, as shown in FIG. 2. Here infra-red sensitive element 8' is mounted so that it is in a plane substantially parallel to the plane of the panel.

I claim:

1. A sensor including a housing, a passive infra-red detector and a microwave detector mounted in said housing, and a panel in said housing, which panel is shaped to define at least one Fresnel lens segment through which infra-red radiation can pass for detection by the passive infra-red detector, and said panel also constituting a radome for said microwave detector, said panel allowing microwave radiation to pass therethrough, said passive infra-red detector including at least one infra-red sensitive element having an electrical output and being positioned in said housing behind said panel in order to receive infra-red radiation through said panel, and a processing circuit connected to said output of said element, said microwave detector including means for transmitting microwaves through said panel and means for receiving microwaves reflected back from a target through said panel, and a processing circuit connected to said receiving means.

2. A sensor according to claim 1, wherein said microwave transmitting and receiving means comprise a transmitting cavity and a receiving cavity each having a respective horn, said infra-red sensitive element being mounted between said horns.

3. A sensor according to claim 1, wherein said microwave transmitting and receiving means comprises a transmitting cavity and a receiving cavity which share a common flared horn.

4. A sensor according to claim 1, wherein the sensor is inset into a wall of the common flared horn.

5. A sensor according to claim 1, wherein the panel is high density polyethylene.

* * * * *